United States Patent Office 3,375,273
Patented Mar. 26, 1968

3,375,273
HYDROXYLAMINE DERIVATIVES AND
PROCESS FOR MAKING THEM
David John Drain, Welwyn Garden City, John Gordon
Bernard Howes, Bengeo, Hertford, and Haydn Windsor Richard Williams, Digswell, Welwyn, England, assignors to T. J. Smith & Nephew Limited, Kingston-upon-Hull, England, a British company
No Drawing. Filed Apr. 9, 1963, Ser. No. 271,596
Claims priority, application Great Britain, Apr. 10, 1962, 13,771/62
The portion of the term of the patent subsequent to Dec. 28, 1982, has been disclaimed
11 Claims. (Cl. 260—538)

This invention relates to hydroxylamine derivatives and to processes for making them.

It is an object of the invention to provide new and useful hydroxylamine derivatives.

It is an object of the present invention to provide inhibitors of enzyme responsible for the metabolism of 5-hydroxytryptamine and catecholamines, both in vitro and in vivo.

It is also an object of the present invention to provide compounds which, when administered to mammals including man, have an effect on the central nervous system.

It is a further object of the present invention to provide compounds which are useful in the treatment of disorders associated with and attributable to abnormal levels at 5-hydroxytryptamine and/or catecholamines.

We have now discovered that certain hydroxylamine derivatives are potent inhibitors of the enzymes responsible for the metabolism of 5-hydroxytryptamine and catecholamines both in vivo and in vitro and when administered to mammals, including man, have an effect on the central nervous system.

These hydroxylamine derivatives are believed to be new and have the general formula:

I

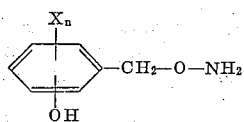

wherein the hydroxyl group shown is in the 2- or 4-position.

X represents a hydrogen or halogen atom and $n$ represents a positive integer from 1 to 12 and the acid-addition salts thereof.

The invention also includes a process for the preparation of compounds of the general Formula I which comprises reacting hydrazine with a benzyloxyphthalimide of the general formula:

II

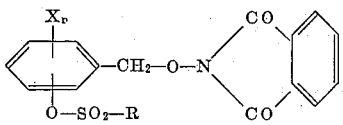

(wherein X and $n$ have the meanings given above, R represents an alkyl or aryl radical, and the group —O—SO$_2$—R is in the 2- or 4-position) and hydrolysing off the R—SO$_2$— group. The phthaloyl group is split off by hydrazinolysis but a further hydrolysis step, preferably with alkali metal hydroxide, is required to remove the R—SO$_2$— group.

The hydrazine is preferably in the form of hydrazine hydrate.

The hydroxylamine derivative formed by the process can be converted to an acid-addition salt by methods known per se. For example, it can be converted to the hydrochloride by reaction with ethanolic hydrogen chloride or to the hydrogen phosphate or dihydrogen phosphate by reaction with orthophosphoric acid or to the oxalate by reaction with a solution of oxalic acid in isopropanol.

The invention will be illustrated by the following examples to which, however, it is not limited. These examples will be preceded by preparations of some of the starting materials employed. In the preparations and examples all the temperatures are in degrees centigrade and weights are in grams (g.).

Preparation 1.—Part A: 2-benzenesulphonyloxy-5-chlorotoluene

Benzenesulphonyl chloride (123.6 g., 0.7 mole) was added portionwise to a solution of 4-chloro-o-cresol (95 g., 0.67 mole) in pyridine (150 ml.), the mixture heated on a steam bath for 30 min., cooled and poured into water (1.5 litres). The precipitated oil solidified on scratching, and was filtered off, washed with 2N HCl and water, and the damp cake dissolved in hot methanol (400 ml.). On cooling the product was obtained as colourless prisms, M.P. 59–62°. Two further recrystallisations from methanol (3 parts v./w.) gave the pure product, M.P. 62.5–63.5° (169 g., 89%).

The following benzenesulphonates were prepared from the corresponding phenols in similar fashion: 4-benzenesulphonyloxy-3-bromo-toluene was obtained as colourless prisms, M.P. 63–5°, after recrystallization from methanol (2 parts v./w.), in 94% yield. 4-benzenesulphonyloxy-3,5-dibromo-toluene was obtained as colourless prisms, M.P. 78–80°, after recrystallisation from ethanol (2 parts v./w.), in 82% yield. 4-benzenesulphonyloxy-3,5-dichloro-toluene was obtained as colourless prisms, M.P. 75–6°, after recrystallisation from ethanol (3 parts v./w.), in 76% yield.

Part B: 2-benzene sulphonyloxy-5-chloro-benzyl bromide.—A mixture of 2-benzenesulphonyloxy-5-chlorotoluene (90.6 g., 0.32 mole), N-bromo-succinimide (57 g., 0.32 mole), benzoyl peroxide (1.25 g.) and carbon tetrachloride (400 ml.) was heated under reflux for 7 hours. The mixture was cooled, succinimide removed by filtration and the filtration evaporated under reduced pressure.

The residuel oil was dissolved in hot methanol (1 part v./w.), and on cooling the product crystallised in colourless plates, M.P. 63–5°. (78.5 g., 68%). Two further recrystallisations from methanol gave the pure product, M.P. 72.5–73.5°.

Preparation 2.—2-benzenesulphonyloxy-benzyl bromide 2-benzenesulphonyloxy-toluene (10.2 g., 0.041 mole) was dissolved in boiling carbon tetrachloride (50 ml.), and the solution was gently heated under reflux while bromine (6.58 g., 0.041 mole) was added dropwise at such a rate that a permanent colour did not persist in the reaction mixture. The bromination was catalysed by irradiating the solution with an unfrosted 500 watt tungsten filament lamp.

The solvent was removed under reduced pressure to give an oil which crystallised on standing. The product, after recrystallisation from methanol (1 part v./w.), was obtained as colourless prisms, M.P. 61–5°. Two further recrystallisations gave the pure product, M.P. 81–2°. (10.64 g., 79%). The following bromides were prepared in similar fashion—4-benzenesulphonyloxy-benzyl bromide was obtained from 4-benzenesulphonyloxy-toluene as a colourless solid (prisms), M.P. 84–6° after recrystallisation from methanol (1 part v./w.), (64% yield). An analytical specimen, after two further recrystallisations from methanol had M.P. 86–7°.

4-benzenesulphonyloxy-3-bromo-benzyl bromide was obtained from 4-benzenesulphonyloxy-3-bromo-toluene (see Preparation 1, Part A) as a colourless solid (prisms), M.P. 94–5° after recrystallisation from methanol (1 part v./w.), (54% yield). An analytical specimen, after one further recrystallisation from methanol had M.P. 96–8°.

4-benzenesulphonyloxy - 3,5 - dibromo-benzyl bromide was obtained from 4-benzenesulphonyloxy-3,5-dibromotoluene as colourless prisms, M.P. 134–6°, after recrystallisation from carbon tetrachloride (2 parts v./w.), in 33% yield.

4-benzenesulphonyloxy - 3,5 - dichloro-benzyl bromide was obtained from 4-benzenesulphonyloxy-3,5-dichlorotoluene as colourless prisms, M.P. 112–4°, after recrystallisation from ethanol (10 parts v./w.), in 51% yield.

*Preparation 3.—N-(2-benzenesulphonyloxy-benzyloxy)-phthalimide*

A mixture of 2-benzenesulphonyloxy-benzyl bromide (see Preparation 2) (9.5 g., 0.029 mole) N-hydroxyphthalimide (4.74 g., 0.029 mole), triethylamine (2.935 g., 0.029 mole) and acetonitrile (60 ml.) was heated under reflux until the red colour was discharged (1½ hr.). The solution was cooled, the precipitate which formed filtered off, and washed with water to remove triethylamine hydrobromide, leaving a small quantity of solid.

The acetonitrile filtrate was evaporated under reduced pressure, the residual oil combined with the water insoluble solid, and the mixture recrystallised from ethanol, to give the product, as colourless needles M.P. 100–103° (10.57 g., 89%). After one further recrystallisation from ethanol, the product had M.P. 111–2°.

The following benzyloxy-phthalimides were prepared in similar fashion:

N-(2-benzenesulphonyloxy-5-chloro-benzyloxy)-phthalimide was obtained from 2-benzenesulphonyloxy-5-chlorobenzyl bromide (see Preparation 1, Part B) as colourless prisms, M.P. 144.5–145.5°, after two recrystallisations from ethanol (56% yield).

N-(4-benzenesulphonyloxy-benzyloxy)-phthalimide was obtained from 4-benzenesulphonyloxy-benzyl bromide (see Preparation 2) as colourless prisms, M.P. 138.5–139.5° after recrystallisation from 95% ethanol (10 parts v./w.) (81.5% yield).

N-(4-benzenesulphonyloxy - 3 - bromo - benzyloxy)-phthalimide was obtained from 4-benzenesulphonyloxy-3-bromo-benzyl bromide (see Preparation 2) as colourless prisms, M.P. 149–50° after two recrystallisations from 1:1 acetone/methanol (1 part v./w.) (61% yield).

N-(4-benzenesulphonyloxy - 3,5 - dibromo-benzyloxy)-phthalimide was obtained from 4-benzenesulphonyloxy-3,5-dibromo benzyl bromide as a colourless microcrystalline solid, M.P. 157°, after recrystallisation from ethanol (20 parts v./w., in 70% yield).

N-(4-benzenesulphonyloxy - 3,5 - dichloro-benzyloxy)-phthalimide was obtained from 4-benzenesulphonyloxy-3,5-dichlorobenzyl bromide as a colourless solid, M.P. 150–2°, after recrystallisation from isopropanol, in 73% yield.

*Example 1.—Part A: 2-benzenesulphonyloxy-benzyl-oxyamine*

A mixture of N-(2-benzenesulphonyloxy-benzyloxy)-phthalimide (see Preparation 3) (57 g., 0.139 mole), 100% hydrazine hydrate (6.97 g., 0.139 mole) and ethanol (350 ml.) was boiled under reflux for 1½ hrs. The mixture was cooled, filtered, and the filtrate evaporated under reduced pressure. Chloroform (200 ml.) was added to the residue, a little phthalhydrazide filtered off, and the chloroform evaporated under reduced pressure. The residue was dissolved in boiling isopropanol (75 ml.), and, on cooling, the product crystallised (small colourless needles), M.P. 73–4°. (25.5 g., 66%). The pure compound, after one further recrystallisation from isopropanol, had M.P. 76–7°.

*Part B: 2 - hydroxy - benzyloxyamine.*—2-benzenesulphonyloxy-benzyloxyamine (25 g., 0.09 mole) was dissolved in a solution of potassium hydroxide (17.8 g., of 85%, 0.27 mole) in methanol (90 ml.), and the solution heated under reflux for 5 min. The solution was cooled, brought to pH 5 with glacial acetic acid, the precipitated potassium benzenesulphonate filtered off, and the filtrate evaporated under reduced pressure. The residue was triturated with water (50 ml.) and the water-insoluble solid so obtained filtered off and dried. The solid was recrystallised from isopropanol (2 parts v./w.), to give the product as colourless needles, M.P. 115–6°. (5.5 g., 44%).

The above product (0.28 g.) was dissolved in isopropanol (15 ml.), and a solution of anhydrous oxalic acid (0.18 g.) in isopropanol (5 ml.) added. The precipitated solid was filtered off and recrystallised twice from isopropanol (60 parts v./w.) to give di-(2-hydroxy-benzyloxyammonium) oxalate (0.17 g.) as colourless plates, M.P. 164.5–165.5° (d).

*Example 2.—3-chloro-6-hydroxy-benzyloxyamine*

A mixture of N-(2-benzenesulphonyloxy-5-chlorobenzyloxy)-phthalimide (see Preparation 3) (52.2 g., 0.117 mole), 100% hydrazine hydrate (6.2 g., 0.124 mole) and ethanol (200 ml.) was boiled under reflux for 1½ hrs. The mixture was cooled, filtered, and the filtrate evaporated under reduced pressure. Chloroform was added to the residue, a little solid filtered off, and the filtrate evaporated to give an oily residue of crude 2-benzenesulphonyloxy-5-chloro-benzyloxyamine (38 g.).

The above product was dissolved in methanol (25 ml.) the solution added to a solution of potassium hydroxide (19.4 g. of 85%, 0.292 mole), in methanol (175 ml.), and the mixture boiled under reflux for 10 mins. The solution was cooled, taken to pH 5 with glacial acetic acid, and evaporated under reduced pressure. Water (150 ml.) was added to the residue, leaving an insoluble oil, which solidified on scratching. The pure product was obtained by recrystallising this material twice from isopropanol (1 part v./w.), as colourless needles M.P. 97–8° (8.6 g., 42% overall).

The above product (0.3 g.) was added to a solution of 88% orthophosphoric acid (0.192 g.) in isopropanol (3 ml.), industrial methylated spirit (3 ml.) added, and the mixture heated to dissolve the precipitate. On cooling 3-chloro-6-hydroxy-benzyloxyammonium dihydrogen phosphate precipitated as colourless needles, M.P. 152–3° (0.34 g.). The pure salt M.P. 156–7° was obtained by recrystallising once from industrial methylated spirits (4 parts v./w.).

The following compounds were obtained in similar fashion:

4-hydroxy-benzloxyamine was obtained from N-(4-benzenesulphonyloxy-benzyloxy)-phthalimide (see Preparation 3) as colourless needles, M.P. 128.5–129.5° after two recrystallisations from isopropanol (1.5 parts v./w.). (46% overall.) Di - (4-hydroxy-benzylammonium)hydrogen phosphate crystallised as colourless needles, M.P. 149–150° from industrial methylated spirit (40 parts v./w).

3-bromo-4-hydroxy-benzyloxyamine was obtained from N - (4-benzenesulphonyloxy-3-bromo-benzyloxy)-phthalimide (see Preparation 3) as a colourless microcrystalline solid after two recrystallisations from a mixture of 1 part ethanol and 3 parts benzene (4 parts v./w.)., M.P. 106–8°. (43% overall.)

Di - (3-bromo-4-hydroxy-benzyloxyammonium) hydrogen phosphate crystallised as colourless needles, M.P. 135–7° from industrial methylated spirit (5 parts v./w.).

Salicylaldehyde - 3 - bromo-4-hydroxy-benzyl-oxime crystallised as colourless needles M.P. 108–110° from di-n-butyl ether.

Crude 3,5-dibromo-4-hydroxy-benzyloxyamine was obtained from N-(4-benzenesulphonyloxy-3,5-dibromo-benzyloxy)-phthalimide as a low melting solid, which decomposed on heating in attempts to purify it by recrystallisation. The overall yield of crude material was 45%.

Di - (3,5-dibromo-4-hydroxy-benzyloxyammonium)oxalate was obtained as a colourless microcrystalline solid.

M.P. 163–4° (d.) after recrystallisation from ethanol (40 parts v./w.).

Crude 3,5-dichloro-4-hydroxy-benzyloxyamine was obtained from N-(4-benzenesulphonyloxy-3,5-dichloro-benzyloxy)-phthalimide as a yellow gum in 38% overall yield.

Di-(3,5-dichloro-4-hydroxy-benzyloxyammonium)-oxalate was obtained as a colourless microcrystalline solid, M.P. 174–5° (d.) after recrystallisation from ethanol (40 parts v./w.).

We claim:

1. A hydroxylamine derivative of general formula

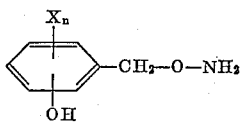

wherein the hydroxyl group shown is in a position selected from the group consisting of the 2- and 4-positions,
X represents a member selected from the group consisting of hydrogen and halogen atoms, and
n represents a positive integer from 1 to 2.

2. An acid-addition salt of a hydroxylamine derivative as claimed in claim 1.

3. A compound selected from 2-hydroxy-benzyloxyamine and di-(2-hydroxy-benzyloxyammonium) oxalate.

4. A compound selected from 3-chloro-6-hydroxybenzyloxyamine and 3-chloro-6-hydroxy-benzyloxyammonium dihydrogen phosphate.

5. A compound selected from 4-hydroxy-benzyloxyamine and di-(4-hydroxy-benzyloxyammonium) hydrogen phosphate.

6. A compound selected from 3-bromo-4-hydroxybenzyloxyamine and di-(3-bromo-4-hydroxy-benzyloxy-ammonium) hydrogen phosphate.

7. A compound selected from 3,5-dibromo-4-hydroxy-benzyloxyamine and di-(3,5-dibromo-4-hydroxy-benzyloxy-ammonium) oxalate.

8. A compound selected from 3,5-dichloro-4-hydroxy-benzyloxyamine and di-(3,5-dichloro-4-hydroxy-benzyloxyammonium) oxalate.

9. A process for the preparation of a compound of general formula

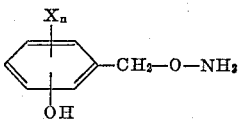

wherein the hydroxyl group shown is in a position selected from the group consisting of the 2- and 4-positions,
X represents a member selected from the group consisting of the hydrogen and halogen atoms, and
n represents a positive integer from 1 to 2, which comprises reacting hydrazine with a benzyloxyphthalimide of general formula

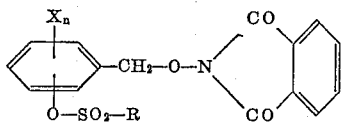

wherein X and n have the meanings given above and
R represents a member selected from the group consisting of the alkyl and aryl radicals, and
the group —O—SO$_2$—R is in a position selected from the group consisting of the 2- and 4-positions, and hydrolysing off the R—SO$_2$— group from the product.

10. A process as claimed in claim 9 in which the R—SO$_2$— group is hydrolysed off by means of an alkali metal hydroxide.

11. A process as claimed in claim 9 in which the hydrazine is used in the form of hydrazine hydrate.

References Cited

UNITED STATES PATENTS

| | | | |
|---|---|---|---|
| 3,097,136 | 7/1963 | Godefroi et al. | 167—65 |
| 3,127,316 | 3/1964 | Ruskin | 167—65 |
| 2,687,433 | 8/1954 | Beckham | 260—538 |
| 2,560,670 | 7/1951 | Faith | 260—623 |
| 2,225,619 | 12/1940 | Britton et al. | 167—31 |
| 2,233,407 | 3/1941 | Flelt | 167—31 |
| 3,226,446 | 12/1965 | Drain et al. | 260—479 X |

LORRAINE A. WEINBERGER, *Primary Examiner.*
RICHARD K. JACKSON, *Examiner.*
T. L. GALLOWAY, *Assistant Examiner.*